United States Patent
Stockmaster et al.

(10) Patent No.: US 12,184,409 B1
(45) Date of Patent: Dec. 31, 2024

(54) DIFFERENCE-BASED JAMMER DETECTION SYSTEM

(71) Applicant: BAE SYSTEMS Information and Electronic Systems Integration Inc., Nashua, NH (US)

(72) Inventors: Michael H. Stockmaster, Edgemont, SD (US); Ying Cho J. Lai, Hiawatha, IA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 48 days.

(21) Appl. No.: 18/345,023

(22) Filed: Jun. 30, 2023

(51) Int. Cl.
*H04K 3/00* (2006.01)
*H01Q 3/26* (2006.01)
*H04B 7/0426* (2017.01)

(52) U.S. Cl.
CPC ........... *H04K 3/224* (2013.01); *H01Q 3/2611* (2013.01); *H04B 7/043* (2013.01)

(58) Field of Classification Search
CPC ................... H04K 3/224; H04K 3/22; H04K 3/00; H01Q 3/2611; H04B 7/043
See application file for complete search history.

(56) References Cited

U.S. PATENT DOCUMENTS

| | | |
|---|---|---|
| 6,084,540 A | 7/2000 | Yu |
| 2005/0122263 A1 | 6/2005 | Fuchser et al. |
| 2014/0247186 A1 | 9/2014 | Daneshmand et al. |
| 2015/0138992 A1 | 4/2015 | Jover |
| 2015/0256286 A1 | 9/2015 | Johnson et al. |
| 2021/0211170 A1* | 7/2021 | Lai .................. H04B 7/0617 |

OTHER PUBLICATIONS

International Search Report, PCT/US24/31613, mailed Aug. 21, 2024, 11 pages.

* cited by examiner

*Primary Examiner* — Keith Ferguson
(74) *Attorney, Agent, or Firm* — Scott J. Asmus (57) ABSTRACT

Techniques are provided for jammer detection. A methodology implementing the techniques according to an embodiment includes steering a beam in a specified direction to generate a power measurement, the specified direction selected from a plurality of directions, such that the method comprises scanning through the plurality of directions. The method also includes adaptively steering a null in the specified direction and measuring a gain of the received signal in the null direction. The method further includes calculating a difference between the power measurement and the measured gain and generating a difference-based detection that the received signal is associated with a jammer at the specified direction. The difference-based detection is based on a comparison of the power difference to a power difference threshold value. The power difference threshold value is based on a desired probability of false alarm and probability of detection, and/or desired angular resolution.

20 Claims, 8 Drawing Sheets

(3 of 8 Drawing Sheet(s) Filed in Color)

DIFFERENCE-BASED JAMMER DETECTION SYSTEM

FIELD OF DISCLOSURE

The present disclosure relates to electronic counter-measures, and more particularly, to a jammer detection system.

BACKGROUND

Situational awareness is an important aspect of military operations, and operations in other conflict scenarios, and often includes direction finding (DF) for sources of signal jammers. DF techniques, however, may produce false alarms (e.g., an indication of jamming signal sources that are not real). These false alarms can distract from real threats, burden processing systems and operators of those systems, and potentially result in unintended actions with undesired consequences.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Although the following Detailed Description will proceed with reference being made to illustrative embodiments, many alternatives, modifications, and variations thereof will be apparent in light of this disclosure.

DETAILED DESCRIPTION

Techniques are provided herein for detection of jammer signals. The techniques may be used to, for example, reduce probability of false alarm (Pfa) and/or improve probability of detection (Pd). As described above, accurate and reliable direction finding of jammer signals can improve situational awareness, but false alarms can distract from real threats and can negatively impact operations. While detection improvements can be achieved through the deployment of multiple cooperating DF platforms (e.g., in a multi-ship, multi-platform scenario), this approach adds significant cost and complexity and relies on the ability to coordinate and communicate between platforms, which may be difficult or impossible in some hostile environments.

To this end, techniques are provided to improve reliability of jammer signal detection. In an example, the improvement manifests with respect to a reduction in false alarms and can be accomplished using data provided from a single sensor (e.g., an antenna array or beamforming array), without requiring information or assistance from other platforms or outside sources. In some embodiments, the disclosed jammer signal detection techniques include difference-based jammer detection. Difference-based jammer detection exploits the fact that an actual jamming signal will generally be associated with a relatively higher measured signal power when a beam is steered in the direction of the jammer compared to when a null is steered in the direction of the jammer. The difference between the measured power of the steered beam and the gain (or attenuation) of the adaptively-steered null can be used, as at least one factor, to detect jammers and distinguish between actual jammers and false alarms, as will be described in greater detail below. Additionally, a number of thresholding parameters can be set to balance or otherwise adjust or tune the Pfa and Pd of the system, depending on given mission requirements or needs of the system operators.

A system to implement the disclosed techniques can be hosted on, or otherwise be incorporated into the electronic systems of an aircraft or other vehicle, a navigation system, an anti-jamming system, a tracking ground station, a personal computer, workstation, laptop computer, tablet, touchpad, portable computer, handheld computer, cellular telephone, smartphone, embedded system, or any other platform where jamming detection is needed.

In accordance with an embodiment, an example methodology to implement these techniques includes steering a beam in a specified direction to generate a power measurement. The specified direction may be selected from a plurality of directions, such that the method comprises scanning through the plurality of directions. In some embodiments, the specified direction may be obtained from a jammer DF system configured to estimate an angle of arrival of a jamming signal that may be present in a received signal. The method also includes adaptively steering a null in the specified direction and measuring the gain of the received signal in the null direction. The method further includes calculating a difference between the power measurement and the gain of the received signal in the null direction. The method further includes generating a difference-based detection that the received signal is associated with a jammer at the specified direction. The difference-based detection is based on a comparison of the calculated difference to a difference threshold value, wherein the difference threshold value is based on a desired probability of false alarm and probability of detection, and/or desired angular resolution.

It will be appreciated that the techniques described herein may provide improved jammer signal detection with reduced false alarms, compared to existing techniques that do not employ null-steering. The techniques disclosed herein may further be implemented in hardware or software or a combination thereof. Numerous embodiments and applications will be apparent in light of this disclosure.

System Architecture

Figure 1:
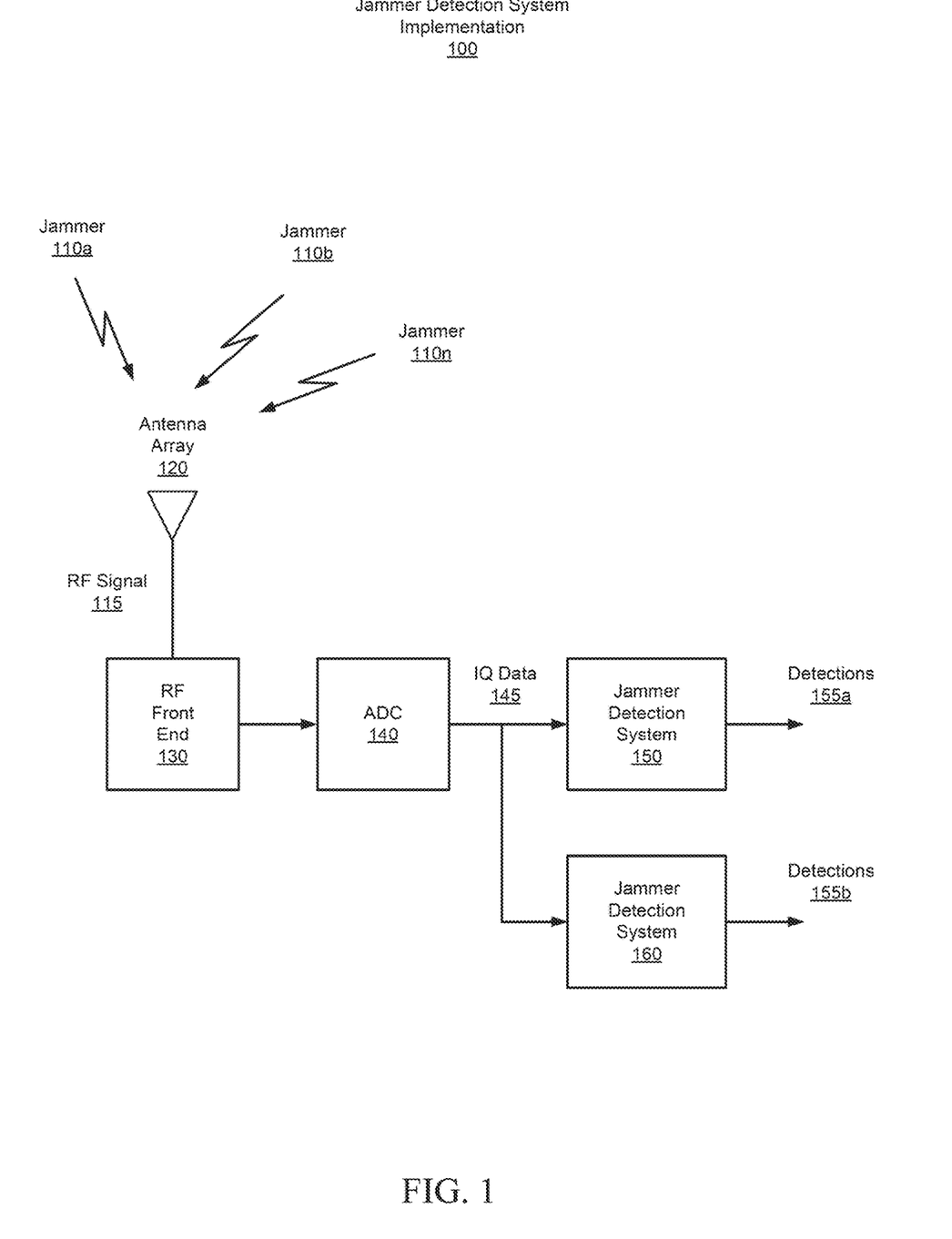
FIG. 1 illustrates an implementation including multiple jammer detection systems, in accordance with certain embodiments of the present disclosure.

FIG. 1 illustrates an implementation 100 of jammer detection systems 150 and 160, in accordance with certain embodiments of the present disclosure. As shown in this implementation, antenna array 120 is configured to receive radio frequency (RF) signals from any number of sources which may include, for example, signal jammers 110a, 110b, ... 110n. The antenna array 120 provides the received RF signal 115 to an RF front end 130 that, in some embodiments, is configured to convert the received RF signal down to an intermediate frequency (IF) signal or a baseband signal and perform any suitable filtering and amplification. An analog to digital converter (ADC) 140 is configured to convert the analog signal provided by the RF front end into a digital signal comprising in-phase and quadrature data samples (IQ data) 145 for use by either or both of the jammer detection systems 150 and 160, which are configured to provide jammer detections 155a and 155b respectively, as will be described in greater detail below.

Figure 2:
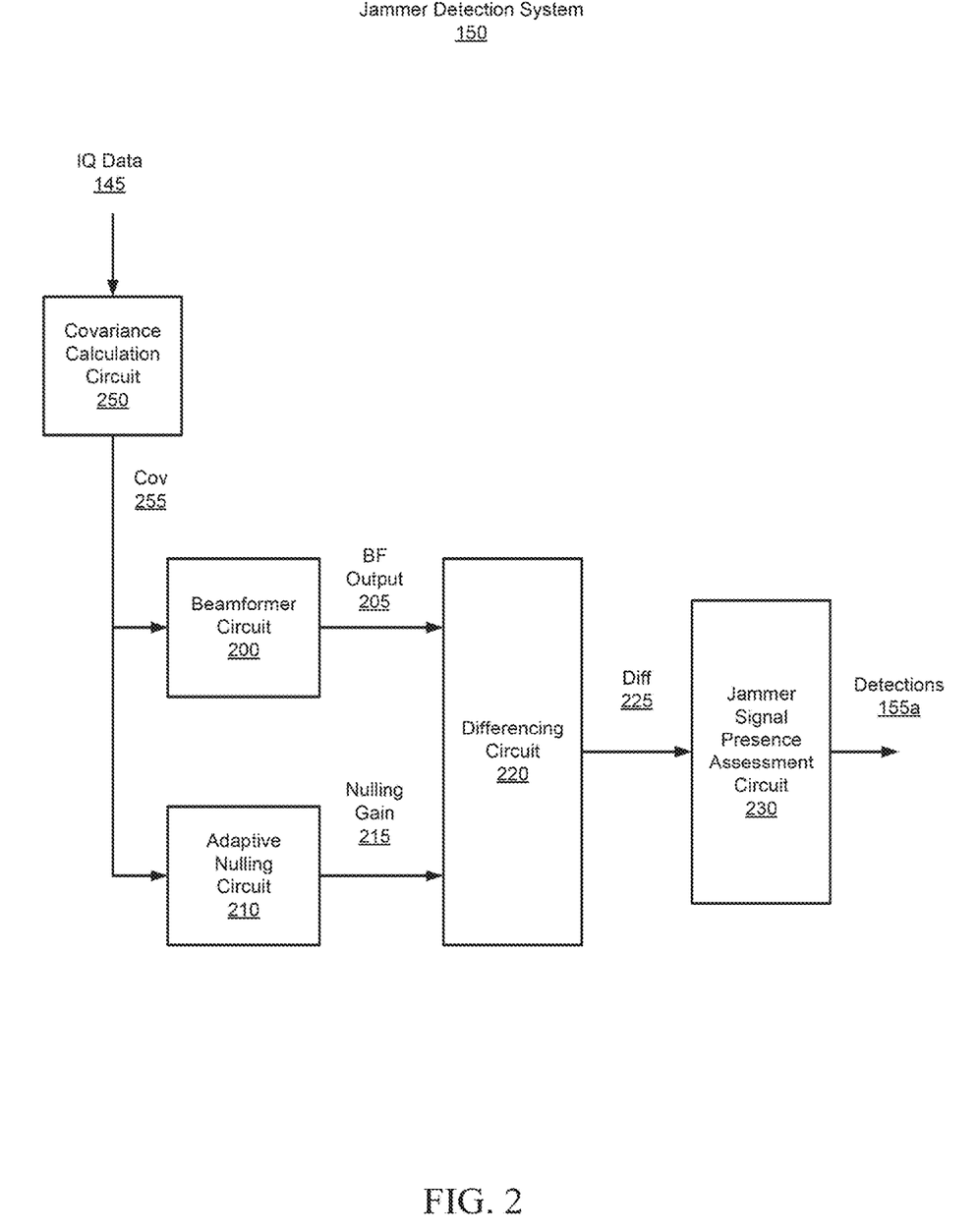
FIG. 2 is a block diagram of one of the jammer detection systems of FIG. 1, configured in accordance with certain embodiments of the present disclosure.

FIG. 2 is a block diagram of one of the jammer detection systems, 150 of FIG. 1, configured in accordance with certain embodiments of the present disclosure. The jammer detection system 150 is configured to provide difference-based jammer detection and is shown to include a covariance calculation circuit 250, a beamforming circuit 200, an adaptive nulling circuit 210, a differencing circuit 220, and a jammer signal presence assessment circuit 230. As previously noted, difference-based jammer detection exploits the fact that an actual jamming signal will generally be associated with a higher measured signal power when a beam is steered in the direction of the jammer compared to the gain of an adaptive null steered in the direction of the jammer. In contrast, regions that may exhibit jammer false alarms may not exhibit a higher relative power when a beam is steered nor a reduction in gain in the direction of the potential jammer since that potential jammer does not actually exist. The difference in measured power obtained through the steered beam versus the measured gain obtained through the steered null can be used, as at least one factor, to distinguish between actual jammers and false alarms.

The covariance calculation circuit 250 is configured to calculate the covariance 255 between the IQ data signals 145 provided by each of the antennas of the antenna array 120. For example, the covariance can be represented by a covariance matrix in which each element (i, j) of the matrix stores the covariance between pairs of antenna elements i and j.

The beamforming circuit 200 is configured to steer a beam in a direction of interest and measure the power of a received signal in that direction as beamforming output 205. The beamforming circuit 200 allows energy arriving in the direction of the beam to pass through while reducing or nulling energy arriving from other directions. In some embodiments, the direction comprises an azimuth angle and an elevation angle. In some embodiments, the system may be configured to scan through a plurality of directions (e.g., a range of azimuths from zero to 360 degrees, for example at three degree intervals, and/or a range of elevation angles). In such case, the direction of interest is the azimuth and elevation of the current scan step. In some embodiments, the beamformer 200 operates on the covariance date 255, while in other embodiments the beamformer may operate directly on the IQ data 145. In some embodiments, the beamforming circuit may employ an adaptive beamforming process or algorithm, a minimum power beamforming process or algorithm with quadratic constraint, or any suitable beamforming technique in light of the present disclosure.

The adaptive nulling circuit 210 is configured to adaptively steer nulls in the direction of actual jammers based on the covariance data 255. The adaptive nulling circuit 210 reduces or nulls energy arriving in the direction of the jammers. In some embodiments, the adaptive nulling circuit may employ a constrained power minimization nulling process or algorithm or any suitable adaptive nulling technique in light of the present disclosure. The adaptive nulling circuit 210 provides the null gain (or attenuation) 215 of the received signal in the direction being assessed.

The differencing circuit 220 is configured to calculate a difference 225 between the measured power 205 of the beamforming circuit 200 and the nulling gain 215 generated by the adaptive nulling circuit 210.

The jammer signal presence assessment circuit 230 is configured to detect that the received signal is associated with a jammer in the direction of interest (or current scan direction). In some embodiments, the difference-based detections 155a are based on a comparison of the difference 225 to a threshold value. In some embodiments, the threshold value is selected based on a desired Pfa, a desired Pd, and/or a desired angular resolution. For example, raising the threshold may improve angular resolution at the expense of an increased Pfa.

Figure 3:
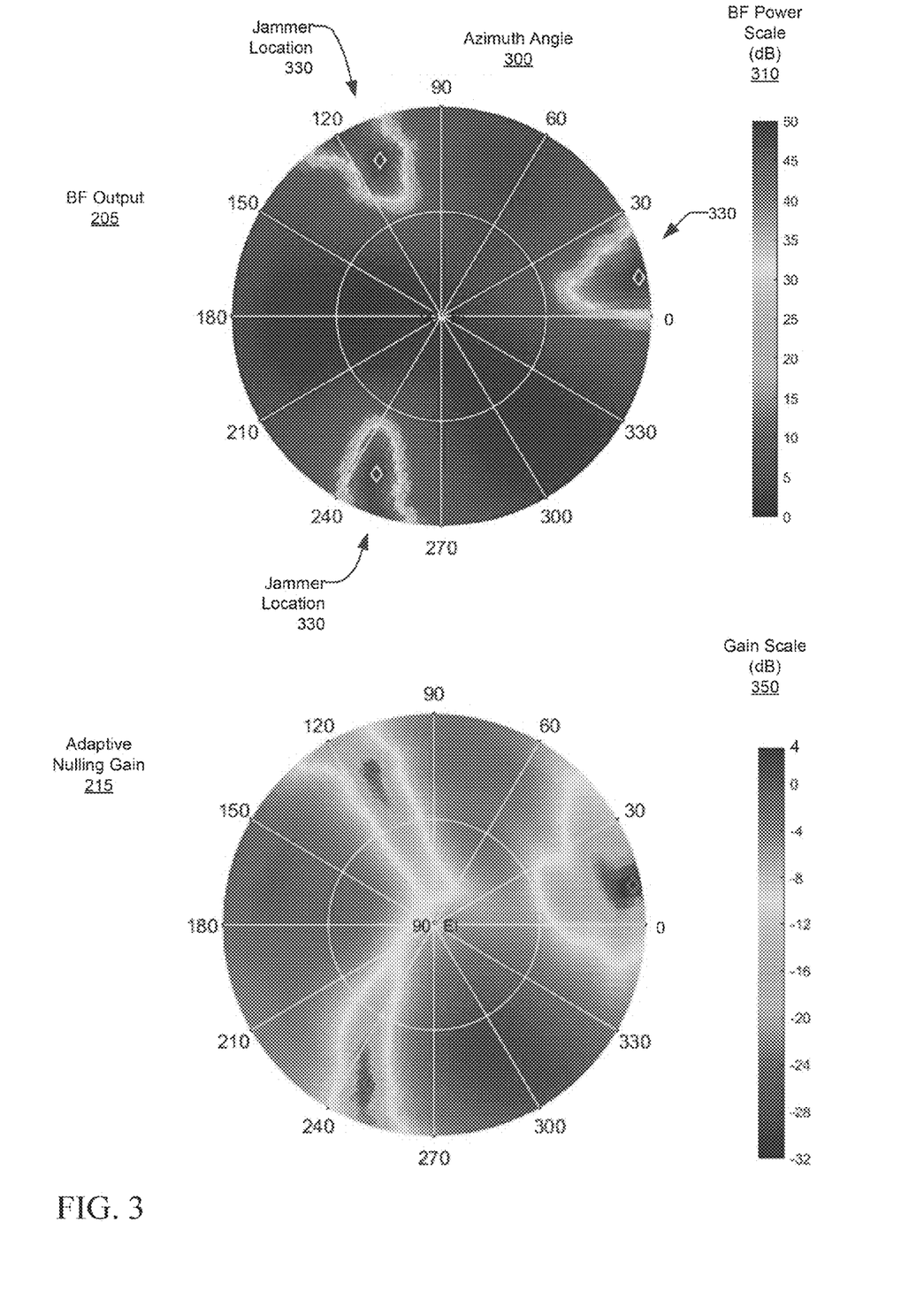
FIG. 3 illustrates a beamformer output plot and an adaptive nulling gain plot, in accordance with certain embodiments of the present disclosure.

FIG. 3 illustrates a beamformer output plot 205 and an adaptive nulling gain plot 215, in accordance with certain embodiments of the present disclosure. The beamformer output plot 205 shows measured power of the received signal over a range of azimuth angles 300 resulting from a sweep of the beamformer over that azimuth range, for an example jammer scenario that includes three jammers. A color coded legend 310 is provided to indicate the relative beamforming output power in decibels (dB), ranging from 50 dB (at the red end) down to 0 dB at the blue end. The locations of the three jammers that are present in this example are shown by diamonds 330.

The adaptive nulling gain plot 215 shows adaptive nulling gain over the range of azimuth directions 300 resulting from a sweep of the nulls over that azimuth range, for the same jammer scenario. A color coded legend 350 is provided to indicate the nulling gain in decibels (dB), ranging from 4 dB (at the red end) down to −32 dB at the blue end. As can be seen, the nulling gain (attenuation) is larger (−20 to −30 dB) in the regions near the jammer locations 330.

Figure 4:
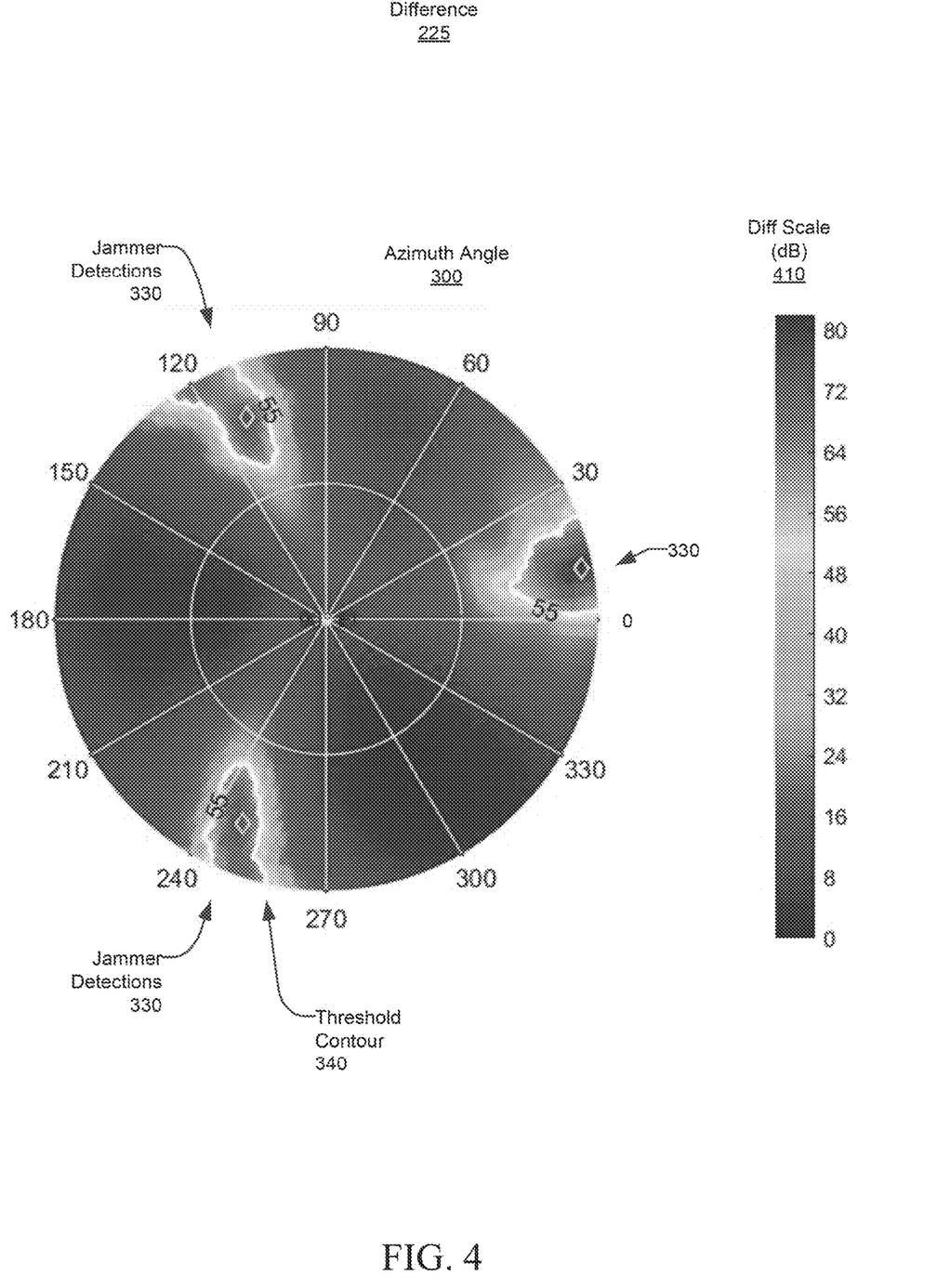
FIG. 4 illustrates a difference plot, in accordance with certain embodiments of the present disclosure.

FIG. 4 illustrates a difference plot 225, in accordance with certain embodiments of the present disclosure. The difference plot 225, which corresponds to the same jammer scenario of FIG. 3, shows the difference between the beamformer output 205 and the adaptive nulling gain 215 over the range of azimuth directions 300. A color coded legend 410 is provided to indicate the difference in decibels (dB), ranging from 80 dB (at the red end) down to 0 dB at the blue end. For directions that are associated with actual jammer locations 330, the power difference is expected to be relatively large, as shown by colors at the red end of the scale. For directions in which there are no jammers, the power difference is expected to be relatively small, as shown by colors at the blue end of the scale. These regions are 70 to 80 dB down from the regions of actual jammer locations. This facilitates selecting a threshold that leads to improved jammer detection without generating false alarms. For example, the threshold may be selected at 55 dB which is illustrated by the threshold contour line 340.

Figure 5:
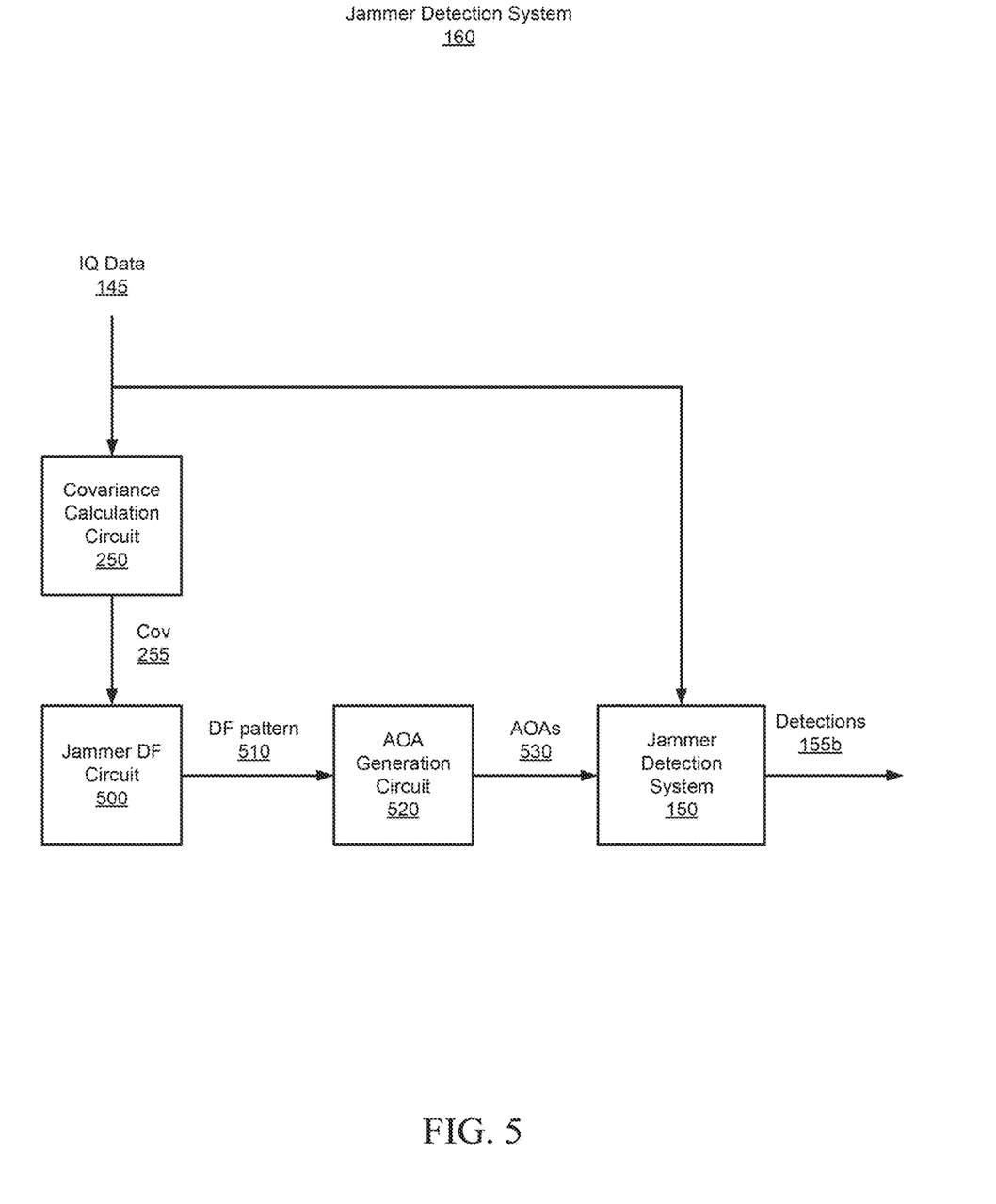
FIG. 5 is a block diagram of another of the jammer detection systems of FIG. 1, configured in accordance with certain embodiments of the present disclosure.

FIG. 5 is a block diagram of another of the jammer detection systems, 160 of FIG. 1, configured in accordance with certain embodiments of the present disclosure. The jammer detection system 160 is shown to include the covariance calculation circuit 250, a jammer DF circuit 500, an angle of arrival (AOA) generation circuit 520, and the previously described jammer detection system 150 of FIG. 2.

Figure 6:
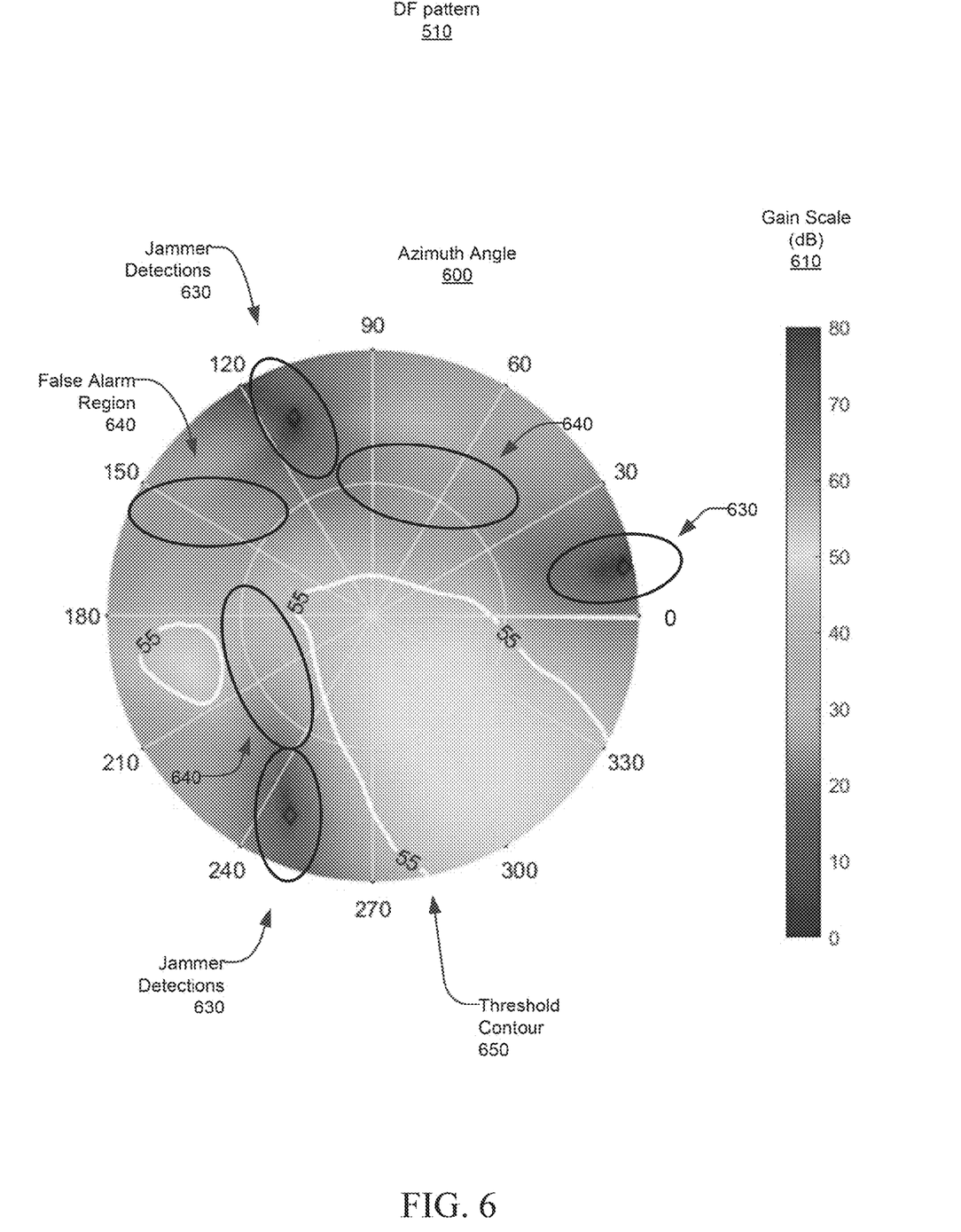
FIG. 6 illustrates a DF pattern plot, in accordance with certain embodiments of the present disclosure.

The jammer DF circuit 500 is configured to generate a DF pattern 510 that indicates potential locations of jamming signals which may be included in the received signal (IQ data 145). In some embodiments, the beamformer 200 operates on the covariance date 255, while in other embodiments the beamformer may operate directly on the IQ data 145. In some embodiments, the jammer DF circuit 500 may employ a minimum variance distortionless response (MVDR) process or algorithm or a multiple signal classification (MUSIC) process or algorithm to perform DF, although any suitable technique may be used in light of the present disclosure. An example DF pattern plot 510 is illustrated and explained below in connection with FIG. 6, but at a high level the DF pattern indicates gain as function of azimuth (and elevation and range). The DF pattern plot of FIG. 6 illustrates the dynamic range of the actual jammer locations relative to the locations where jammers do not exist. Regions where jammers do not exist are typically 20 to 30 dB down from the regions associated with the actual jammer locations. These are the regions from which potential false alarms will exist as picking a threshold that is suitable for good detection of jammers may lead to false detections.

The AOA generation circuit 520 is configured to provide estimated AOAs 530 associated with the jamming signals identified by the jammer DF circuit 500. In some embodiments, the AOA generation circuit is configured to apply a threshold to the gain values in the DF pattern 510 to determine the presence or absence of a jammer and then provide the associated AOA of the jammers determined to be present. The threshold value may be set to achieve a desired Pd and Pfa.

The estimated AOAs 530 are provided to the jammer detection system 150, which operates in the manner, as previously described in connection with FIG. 2, to generate difference-based detections 155b. However, rather than steering a beam to scan through a range of directions to perform a computationally expensive broad region search (e.g., over a 360 degree range encompassing the full sky), the jammer detection system 150 now operates only on the estimated AOAs 530 provided by the AOA generation circuit 520, providing greater efficiency. The jammer detection system 150 applies an additional level of false alarm filtering of the results of the Jammer DF circuit 500 and AOA generation circuit 520.

FIG. 6 illustrates a DF pattern plot 510, in accordance with certain embodiments of the present disclosure. The DF pattern plot 510 shows DF gain generated by the jammer DF circuit 500 over a range of azimuth angles 600, for the same example jammer scenario used in the descriptions of FIGS. 3 and 4. A color coded legend 610 is provided to indicate the DF gain in decibels (dB). The red end of the scale (e.g., higher gain) corresponds to likely jammer locations, while the blue end of the scale indicates a likely absence of jammers. Three jammer signal detections and estimated locations, associated with actual jammers, are shown by the diamonds in ellipses 630. In contrast, ellipses 640 indicate regions in which potential false alarms may occur. In these regions the DF gain is lower but still relatively high enough that a false alarm could be generated depending on the threshold setting. For example, a threshold setting of 55 dB may be selected, as illustrated by the threshold contour 650 which could result in false alarms for signals above that threshold if not for the additional level of false alarm filtering provided by the jammer detection system 150.

Methodology

Figure 7:
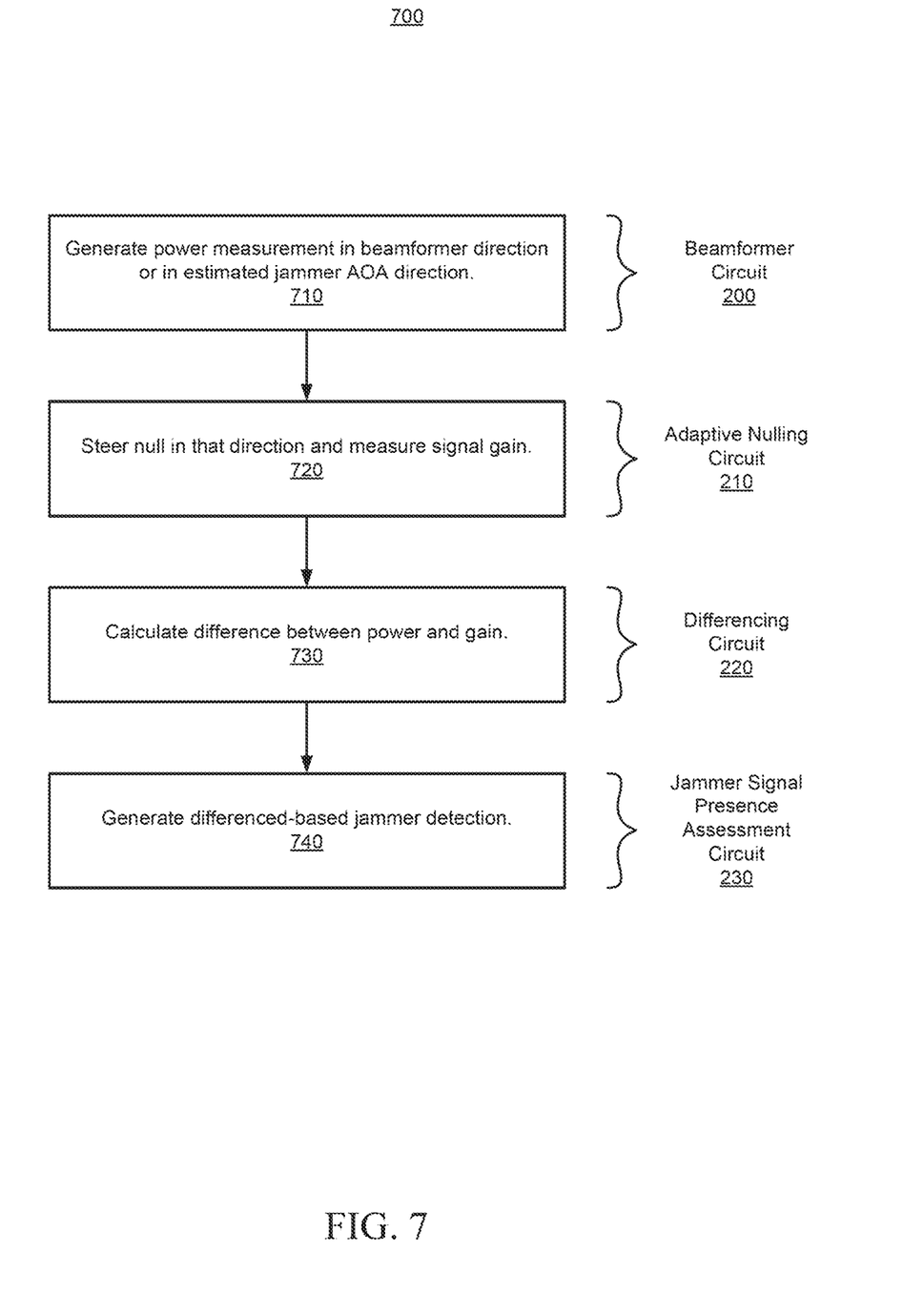
FIG. 7 is a flowchart illustrating a methodology for jammer detection, in accordance with an embodiment of the present disclosure.

FIG. 7 is a flowchart illustrating a methodology 700 for jammer detection with reduced Pfa and improved Pd, in accordance with an embodiment of the present disclosure.

As can be seen, example method 700 includes a number of phases and sub-processes, the sequence of which may vary from one embodiment to another. However, when considered in aggregate, these phases and sub-processes form a process for jammer detection, in accordance with certain of the embodiments disclosed herein. These embodiments can be implemented, for example using the system architecture illustrated in FIGS. 1-6, as described above. However other system architectures can be used in other embodiments, as will be apparent in light of this disclosure. To this end, the correlation of the various functions shown in FIG. 7 to the specific components illustrated in FIGS. 1, 2, and 5, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 700 commences, at operation 710, by generating a power measurement of a received signal in a specified direction. In some embodiments, the specified direction is selected from a plurality of directions, such that the process comprises scanning through the plurality of directions. In some other embodiments, the specified direction is based on an estimated angle of arrival of a jamming signal that is included in the received signal.

At operation 720, an adaptive null is steered in the specified direction and a gain of the received signal is measured in the steered null direction.

At operation 730, a difference is calculated between the power measurement and the gain measurement.

At operation 740, a difference-based detection is generated to indicate that the received signal is associated with a jammer at the specified direction. In some embodiments, the difference-based detection is based on a comparison of the calculated difference to a difference threshold value. In some embodiments, the difference threshold value is based on a desired probability of false alarm (Pfa), a desired probability of detection (Pd), and/or a desired angular resolution.

Example System

Figure 8:
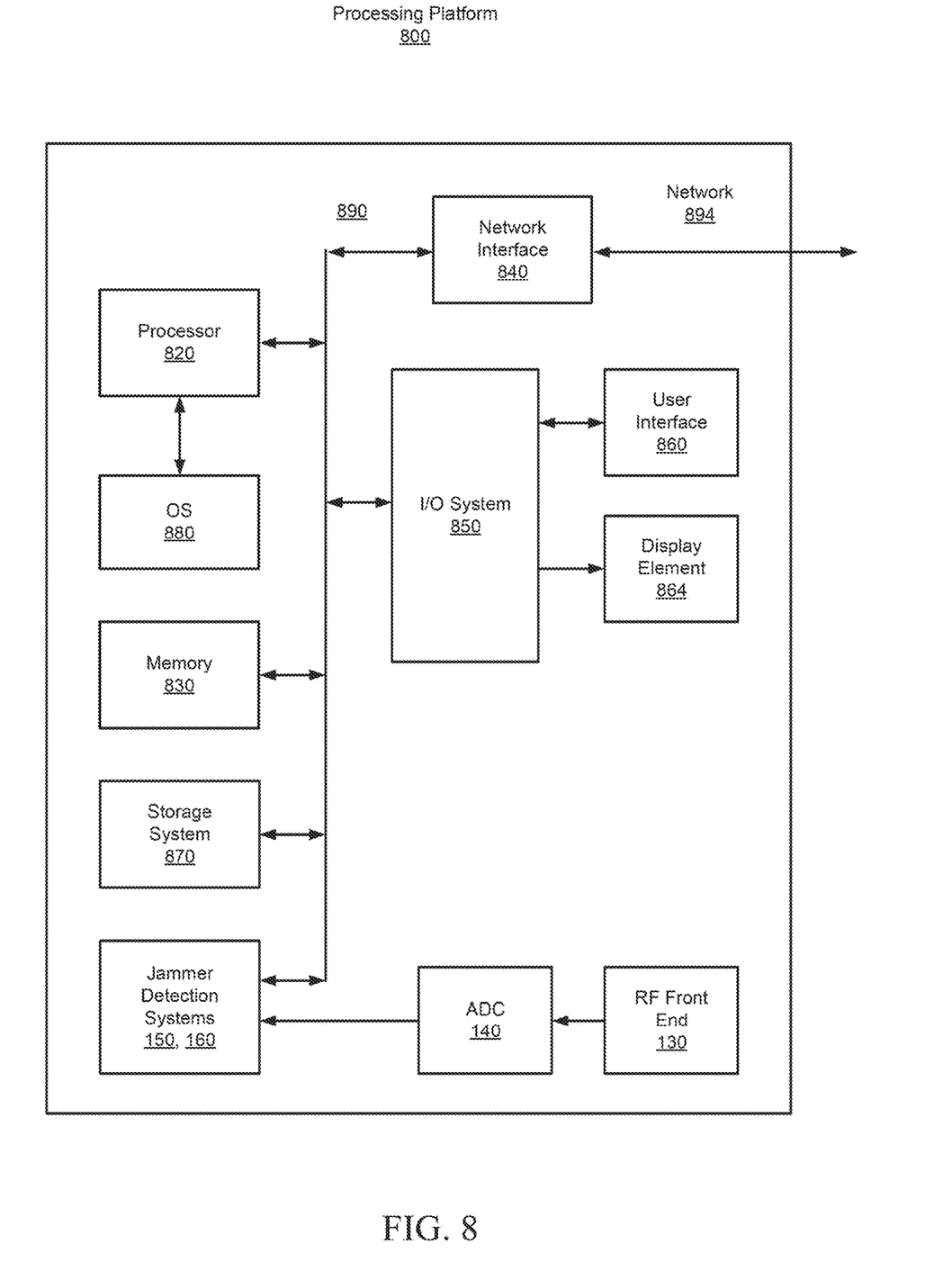
FIG. 8 is a block diagram of a platform for the jammer detection system of FIG. 1, in accordance with certain embodiments of the present disclosure.

FIG. 8 is a block diagram of a processing platform 800 for the jammer detection system of FIG. 1, in accordance with certain embodiments of the present disclosure. In some embodiments, platform 800, or portions thereof, may be hosted on, or otherwise be incorporated into an aircraft, the electronic systems of the aircraft, a ground vehicle, a ship, a tracking ground station, a personal computer, workstation, laptop computer, tablet, touchpad, portable computer, handheld computer, cellular telephone, smartphone, embedded system, or any other suitable platform where detection of jamming signals is performed. Any combination of different devices may be used in certain embodiments.

In some embodiments, platform 800 may comprise any combination of a processor 820, a memory 830, one or both of jammer detection systems 150 and 160, a network interface 840, an input/output (I/O) system 850, a user interface 860, a display element 864, a storage system 870, an ADC 140, and RF front end 130. As can be further seen, a bus and/or interconnect 890 is also provided to allow for communication between the various components listed above and/or other components not shown. Platform 800 can be coupled to a network 894 through network interface 840 to allow for communications with other computing devices, platforms, devices to be controlled, or other resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with platform 800. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random-access memory (RAM). In some embodiments, the memory 830 may include various layers of memory hierarchy and/or memory caches. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 800, and therefore may also be implemented using any suitable existing or subsequently-developed platform.

Network interface circuit 840 can be any appropriate network chip or chipset which allows for wired and/or wireless connection between other components of platform 800 and/or network 894, thereby enabling platform 800 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of platform 800. I/O devices may include, but not be limited to, user interface 860 and display element 864. User interface 860 may include devices (not shown) such as a touchpad, keyboard, and mouse, etc., for example, to allow the user to control the system. Display element 864 may be configured to display jammer detection results, tracking data, navigation data, camera images, or other suitable information. I/O system 850 may include a graphics subsystem configured to perform processing of images for rendering on the display element 864. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 800.

It will be appreciated that in some embodiments, the various components of platform 800 may be combined or integrated in a system-on-a-chip (SoC) architecture. In some embodiments, the components may be hardware components, firmware components, software components or any suitable combination of hardware, firmware or software.

Jammer detection systems 150 and 160 are configured to detect jammers with reduced Pfa and improved Pd, as described previously. Jammer detection system 150 may include any or all of the circuits/components illustrated in FIG. 2, and jammer detection system 160 may include any or all of the circuits/components illustrated in FIG. 5, as described above. These components can be implemented or otherwise used in conjunction with a variety of suitable software and/or hardware that is coupled to or that otherwise forms a part of platform 800. These components can additionally or alternatively be implemented or otherwise used in conjunction with user I/O devices that are capable of providing information to, and receiving information and commands from, a user.

In some embodiments, these circuits may be installed local to platform 800, as shown in the example embodiment of FIG. 8. Alternatively, platform 800 can be implemented in a client-server arrangement wherein at least some functionality associated with these circuits is provided to platform 800 using an applet, such as a Java applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 894 or remotely coupled to network 894 by one or more other networks and/or communication channels. In some cases, access to resources on a given network or computing system may require credentials such as usernames, passwords, and/or compliance with any other suitable security mechanism.

In various embodiments, platform 800 may be implemented as a wireless system, a wired system, or a combination of both. When implemented as a wireless system, platform 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, application-specific integrated circuits (ASICs, or other purpose-built semiconductor), programmable logic devices, digital signal processors, field programmable gate arrays (FPGAs), logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic)

within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable device. In any such hardware cases that include executable software, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a system for detection of signal jammers, the system comprising: a beamforming circuit configured to steer a beam in a specified direction and measure a power of a received signal in the specified direction; an adaptive nulling circuit configured to steer a null in the specified direction and measure a gain of the received signal in the steered null direction; a differencing circuit configured to calculate a difference between the power and the gain; and a jammer assessment circuit configured to detect that the received signal is associated with a jammer, the detection based on a comparison of the difference to a threshold value.

Example 2 includes the system of Example 1, wherein the specified direction comprises an azimuth angle and an elevation angle, the specified direction is selected from a plurality of directions, and the system is configured to scan through the plurality of directions.

Example 3 includes the system of Examples 1 or 2, wherein the threshold value is selected based on a desired probability of false alarm (Pfa), a desired probability of detection (Pd), and/or a desired angular resolution.

Example 4 includes the system of any of Examples 1-3, further comprising a jammer direction finding (DF) circuit configured to generate a DF pattern for identification of locations of potential signal jammers based on jamming signals included in the received signal.

Example 5 includes the system of Example 4, wherein the jammer DF circuit is configured to generate the DF pattern based on execution of a minimum variance distortionless response (MVDR) process or a multiple signal classification (MUSIC) process.

Example 6 includes the system of Example 4, wherein the threshold value is a first threshold value, and the system further comprises an angle of arrival (AOA) generation circuit configured to estimate AOAs of the jamming signals associated with the potential signal jammers based on a comparison of gain values of the DF pattern to a second threshold value, the second threshold value selected based on a desired Pfa, a desired Pd, and/or a desired angular resolution.

Example 7 includes the system of Example 6, wherein the estimated AOA is employed as the specified direction.

Example 8 is a computer program product including one or more non-transitory machine-readable mediums encoded with instructions that when executed by one or more processors cause a process to be carried out for detection of signal jammers, the process comprising: steering a beam in a specified direction and measuring a power of a received signal in the specified direction; adaptively steering a null in the specified direction and measuring a gain of the received signal in the steered null direction; calculating a difference between the power and the measured gain; and detecting that the received signal is associated with a jammer, the detection based on a comparison of the difference to a threshold value.

Example 9 includes the computer program product of Example 8, wherein the specified direction comprises an azimuth angle and an elevation angle, and the process further comprises selecting the specified direction from a plurality of directions and scanning through the plurality of directions.

Example 10 includes the computer program product of Examples 8 or 9, wherein the threshold value is selected based on a desired probability of false alarm (Pfa), a desired probability of detection (Pd), and/or a desired angular resolution.

Example 11 includes the computer program product of any of Examples 8-10, wherein the process further comprises generating a DF pattern for identification of locations of potential signal jammers based on jamming signals included in the received signal.

Example 12 includes the computer program product of Example 11, wherein the process further comprises generating the DF pattern based on execution of a minimum variance distortionless response (MVDR) process or a multiple signal classification (MUSIC) process.

Example 13 includes the computer program product of Example 11, wherein the threshold value is a first threshold value, and the process further comprises estimating angles of arrival (AOAs) of the jamming signals associated with the potential signal jammers based on a comparison of gain values of the DF pattern to a second threshold value, the second threshold value selected based on a desired Pfa, a desired Pd, and/or a desired angular resolution.

Example 14 includes the computer program product of Example 13, wherein the process further comprises employing the estimated AOA as the specified direction.

Example 15 is a method for detection of signal jammers, the method comprising: steering, by a processor based system, a beam in a specified direction and measuring a power of a received signal in the specified direction; adaptively steering, by the processor based system, a null in the specified direction and measuring a gain of the received signal in the steered null direction; calculating, by the processor based system, a difference between the power and the measured gain; and detecting, by the processor based system, that the received signal is associated with a jammer, the detection based on a comparison of the difference to a threshold value.

Example 16 includes the method of Example 15, wherein the specified direction comprises an azimuth angle and an elevation angle, and the method further comprises selecting the specified direction from a plurality of directions and scanning through the plurality of directions.

Example 17 includes the method of Example 16, wherein the threshold value is selected based on a desired probability of false alarm (Pfa), a desired probability of detection (Pd), and/or a desired angular resolution.

Example 18 includes the method of any of Examples 15-17, wherein the method further comprises generating a DF pattern for identification of locations of potential signal jammers based on jamming signals included in the received signal.

Example 19 includes the method of Example 18, wherein the method further comprises generating the DF pattern based on execution of a minimum variance distortionless response (MVDR) process or a multiple signal classification (MUSIC) process.

Example 20 includes the method of Example 18, wherein the threshold value is a first threshold value, and the method further comprises estimating angles of arrival (AOAs) of the jamming signals associated with the potential signal jammers based on a comparison of gain values of the DF pattern to a second threshold value, the second threshold value selected based on a desired Pfa, a desired Pd, and/or a desired angular resolution, and employing the estimated AOA as the specified direction.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A system for detection of signal jammers, the system comprising:
    a beamforming circuit configured to steer a beam in a specified direction and measure a power of a received signal in the specified direction;
    an adaptive nulling circuit configured to steer a null in the specified direction and measure a gain of the received signal in the steered null direction;
    a differencing circuit configured to calculate a difference between the power and the gain; and
    a jammer assessment circuit configured to detect that the received signal is associated with a jammer, the detection based on a comparison of the difference to a threshold value.

2. The system of claim 1, wherein the specified direction comprises an azimuth angle and an elevation angle, the specified direction is selected from a plurality of directions, and the system is configured to scan through the plurality of directions.

3. The system of claim 1, wherein the threshold value is selected based on a desired probability of false alarm (Pfa), a desired probability of detection (Pd), and/or a desired angular resolution.

4. The system of claim 1, further comprising a jammer direction finding (DF) circuit configured to generate a DF pattern for identification of locations of potential signal jammers based on jamming signals included in the received signal.

5. The system of claim 4, wherein the jammer DF circuit is configured to generate the DF pattern based on execution of a minimum variance distortionless response (MVDR) process or a multiple signal classification (MUSIC) process.

6. The system of claim 4, wherein the threshold value is a first threshold value, and the system further comprises an angle of arrival (AOA) generation circuit configured to estimate AOAs of the jamming signals associated with the potential signal jammers based on a comparison of gain values of the DF pattern to a second threshold value, the second threshold value selected based on a desired Pfa, a desired Pd, and/or a desired angular resolution.

7. The system of claim 6, wherein the estimated AOA is employed as the specified direction.

8. A computer program product including one or more non-transitory machine-readable mediums encoded with instructions that when executed by one or more processors cause a process to be carried out for detection of signal jammers, the process comprising:
    steering a beam in a specified direction and measuring a power of a received signal in the specified direction;
    adaptively steering a null in the specified direction and measuring a gain of the received signal in the steered null direction;
    calculating a difference between the power and the measured gain; and detecting that the received signal is associated with a jammer, the detection based on a comparison of the difference to a threshold value.

9. The computer program product of claim 8, wherein the specified direction comprises an azimuth angle and an elevation angle, and the process further comprises selecting the specified direction from a plurality of directions and scanning through the plurality of directions.

10. The computer program product of claim 8, wherein the threshold value is selected based on a desired probability of false alarm (Pfa), a desired probability of detection (Pd), and/or a desired angular resolution.

11. The computer program product of claim 8, wherein the process further comprises generating a DF pattern for identification of locations of potential signal jammers based on jamming signals included in the received signal.

12. The computer program product of claim 11, wherein the process further comprises generating the DF pattern based on execution of a minimum variance distortionless response (MVDR) process or a multiple signal classification (MUSIC) process.

13. The computer program product of claim 11, wherein the threshold value is a first threshold value, and the process further comprises estimating angles of arrival (AOAs) of the jamming signals associated with the potential signal jammers based on a comparison of gain values of the DF pattern to a second threshold value, the second threshold value selected based on a desired Pfa, a desired Pd, and/or a desired angular resolution.

14. The computer program product of claim 13, wherein the process further comprises employing the estimated AOA as the specified direction.

15. A method for detection of signal jammers, the method comprising:
  steering, by a processor based system, a beam in a specified direction and measuring a power of a received signal in the specified direction;
  adaptively steering, by the processor based system, a null in the specified direction and measuring a gain of the received signal in the steered null direction;
  calculating, by the processor based system, a difference between the power and the measured gain; and
  detecting, by the processor based system, that the received signal is associated with a jammer, the detection based on a comparison of the difference to a threshold value.

16. The method of claim 15, wherein the specified direction comprises an azimuth angle and an elevation angle, and the method further comprises selecting the specified direction from a plurality of directions and scanning through the plurality of directions.

17. The method of claim 15, wherein the threshold value is selected based on a desired probability of false alarm (Pfa), a desired probability of detection (Pd), and/or a desired angular resolution.

18. The method of claim 15, wherein the method further comprises generating a DF pattern for identification of locations of potential signal jammers based on jamming signals included in the received signal.

19. The method of claim 18, wherein the method further comprises generating the DF pattern based on execution of a minimum variance distortionless response (MVDR) process or a multiple signal classification (MUSIC) process.

20. The method of claim 18, wherein the threshold value is a first threshold value, and the method further comprises estimating angles of arrival (AOAs) of the jamming signals associated with the potential signal jammers based on a comparison of gain values of the DF pattern to a second threshold value, the second threshold value selected based on a desired Pfa, a desired Pd, and/or a desired angular resolution, and employing the estimated AOA as the specified direction.

* * * * *